Figure 1:
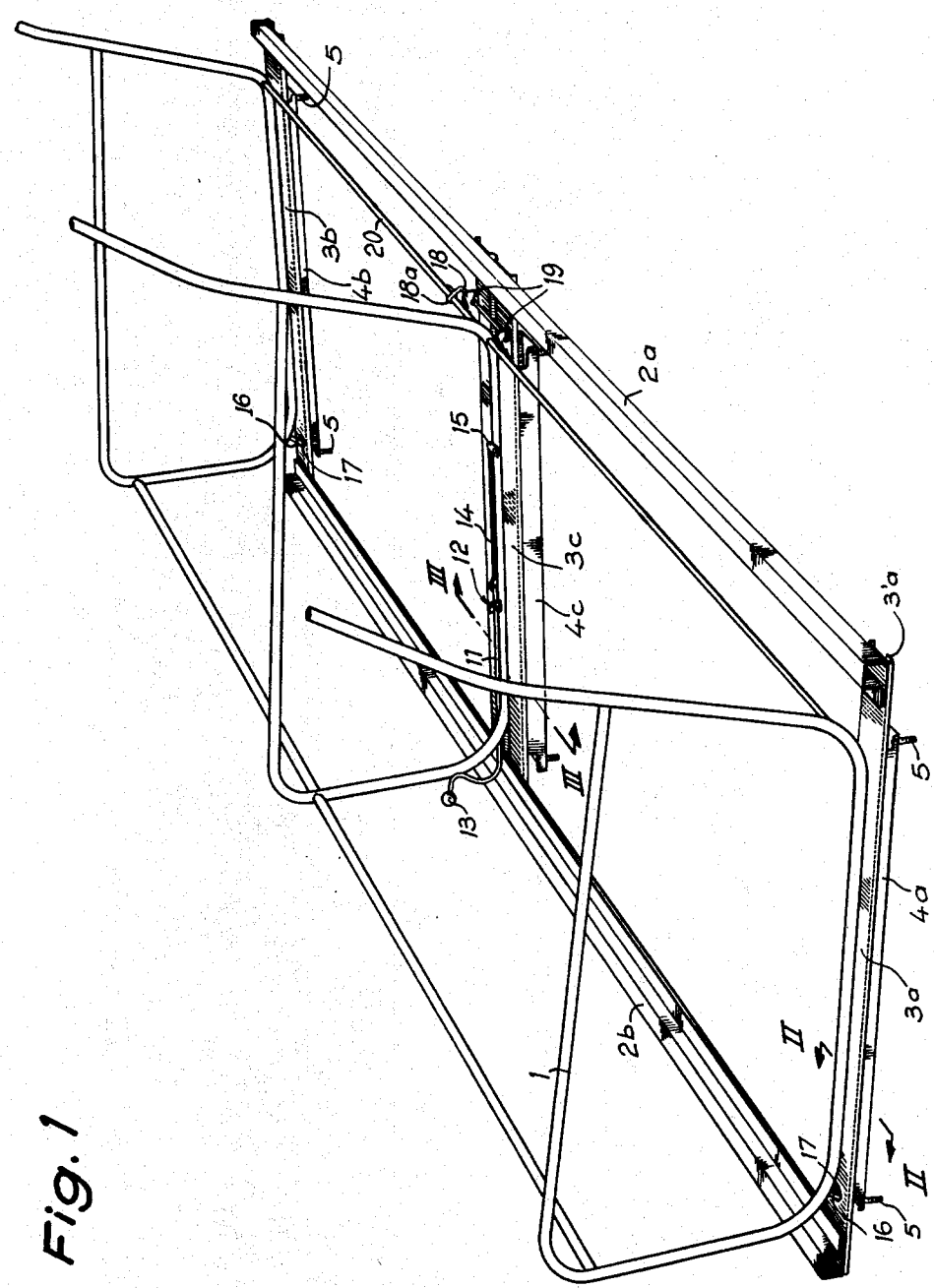

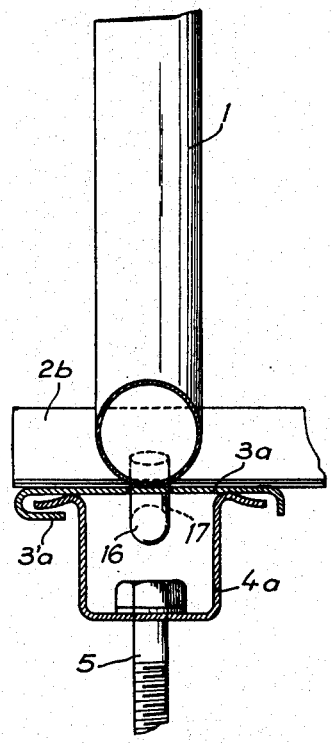
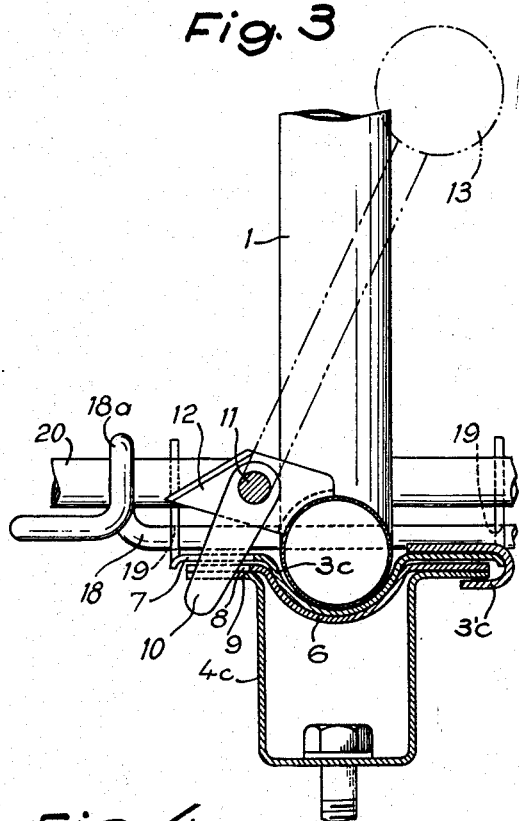
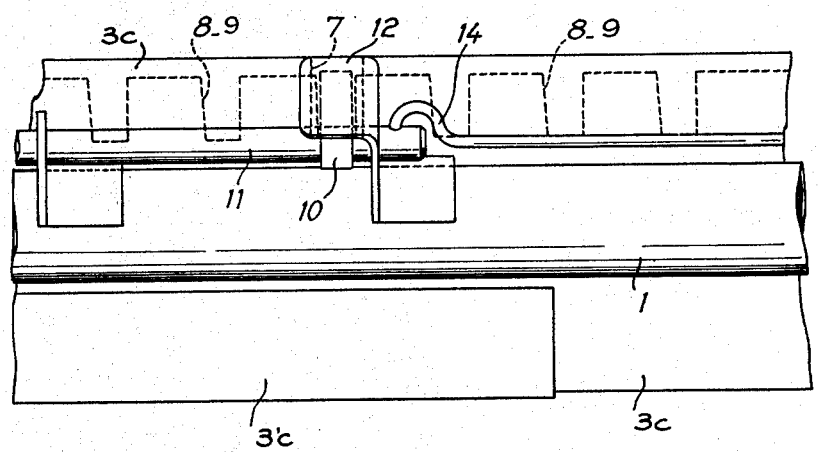

United States Patent Office 3,185,431
Patented May 25, 1965

3,185,431
ADJUSTABLE SEAT FOR AUTOMOBILES
Edmond Henry-Biabaud, Paris, France, assignor to Societe Anonyme Andre Citroen, Paris, France, a French company
Filed Dec. 11, 1962, Ser. No. 243,895
Claims priority, application France, Dec. 12, 1961, 881,642, Patent 1,315,836
4 Claims. (Cl. 248—429)

The present invention relates to car seats whose position can easily be adjusted forward or back from an intermediate position. The seat may be a single seat or a bench seat.

According to the invention, a seat for this purpose comprises a frame free to slide in relation to the floor of the vehicle while being laterally guided by only a single guiding support member.

With this arrangement, the adjustment can easily be made and the seat movement, forwards or backwards, can be obtained with little effort, which is not always the case when there are two guiding support members, due to the varying extent to which the parts can depart from parallel or jam when a load is applied to the seat.

The frame can be guided by giving one of its elements a convex external form, for example; it can be curved or polyhedric, and may be engaged in a trough of corresponding shape fixed to the floor.

The frame of the seat may be constituted by a skeleton, which may be tubular, for example, fixed to a frame which may or may not be free to move, such frame bearing the single means of control of the seat.

In order that the invention may be more clearly understood, reference will now be made to the accompanying drawings which show one embodiment of a bench seat according thereto, by way of non-limiting example, and in which:

FIGURE 1 shows a perspective view of the bench seat,
FIGURE 2 shows a section in the plane II—II shown in FIGURE 1,
FIGURE 3 shows a section in the plane III—III shown in FIGURE 1, and
FIGURE 4 is a plan view of a detail.

Referring now to the drawings, there is shown a bench seat comprising a tubular skeleton 1 fixed to a supporting frame; the latter is made up of two elongated, parallel girders 2a and 2b extending transversely and interconnected, at their ends, by tie members 3a and 3b extending in the direction of the desired adjustment of the seat, that is, fore and aft. The centers of girders 2a and 2b are also connected by a tie member 3c which is parallel to the members 3a and 3b.

The tie members 3a and 3b are flat and rest slidably on supporting members 4a and 4b. The members 4a and 4b are channel shaped and have lateral flanges along their upper edges to constitute bearing surfaces for the related members 3a and 3b. The channel-shaped supporting members 4a and 4b are fixed to the floor of the vehicle, by screws 5, for example passing through the bottom portions thereof. If so desired, the outer edge of the tie members 3a and/or 3b can be bent down over the supports 4a or 4b respectively, as shown at 3'a in FIGURE 2, in order to prevent any accidental raising of the seat while permitting lateral play of each member 3a or 3b relative to the supporting member 4a or 4b so that each of the members 4a and 4b constitutes only a sliding member.

The tie member 3c, meanwhile, has the shape of a trough partly surrounding the corresponding tube of the skeleton 1. The trough-shaped member 3c is fitted into a second trough-shaped element 6 which is a part of the transverse support 4c and also has lateral flanges at the opposite sides of the trough-shaped element 6. The support 4c is fixed to the floor (FIG. 3). One of the edges of the tie member 3c may be bent down over the support 4c or include a part having such an edge, as shown at 3'c, to avoid rocking the seat in the event of unusual strain. It will be apparent that the support 4c and the element 6 fixed thereto constitute a single lateral guiding member for the frame and skeleton of the seat during forward and rearward adjustment of the latter.

Means are provided for fixing the frame in relation to the floor of the vehicle. In the embodiment shown, one of the outer edges of the tie member 3c has a slot or notch 7 corresponding to a series of slots of similar shape at 8 and 9 provided on the edges of the trough 6 and of the support 4c. The slots at 8 and 9 are exactly opposite one another and the seat can be fixed in any position in which the slot 7 is opposite a pair of slots 8 and 9 by engaging a bolt simultaneously in slot 7 and in this pair of slots 8 and 9. This bolt may, for example, the constituted by a latch-pin 10 fixed to one of the ends of a rod 11 which is free to revolve and mounted on a support 12 which is fixed to the skeleton 1 and whose other end has a control knob 13. A torsion wire 14 fixed at 15 on tie members 3c of the frame and hooked onto the end of the rod keeps the pin 10 in the locked position.

The entire seat may be free to move, as is shown in the drawing. In this case the skeleton may be independent of the frame and kept in position on the latter, in this instance partly by means of curved lugs 16 which are firmly fixed to the skeleton and which engage in oblong holes 17 provided in the tie members 3a and 3b, and partly by means of a hook 18; the latter may engage in holes 19 made in the sides of the tie member 3c and hook onto a rod 20 firmly attached to the skeleton. It is important to meet the condition that the engagement of the head 18a of the hook with the rod 20 be fairly tight so that the hook cannot disengage of itself.

It will be appreciated that the invention is not limited to the specific details disclosed and that various modifications may be made thereto without departing from the scope thereof as defined in the appended claims.

What I claim is:
1. A seat for an automobile which is adjustable in the fore and aft direction, comprising a seat supporting skeleton, a frame having said skeleton removably secured thereon, and supporting members for permanent attachment to the floor of an automobile and supporting said frame in slidably adjustable fashion, said supporting members extending parallel to said direction of adjustment of the seat and including a single lateral guiding member and at least one sliding member, and said frame including a first member at least partly embraced, and laterally guided by said single guiding member and movable along the latter and a second member slidable on said sliding member and having substantial lateral play with respect to the latter.

2. An adjustable seat as in claim 1; further comprising interengageable portions on said sliding member and said second member of the frame for preventing lifting of the latter from said supporting members.

3. An adjustable seat as in claim 1; further comprising means for locking said frame at selected positions along said supporting members.

4. An adjustable seat as in claim 1; wherein said single guiding member is upwardly concave and said first member of the frame is downwardly convex.

(References on following page)

References Cited by the Examiner

UNITED STATES PATENTS

| | | | |
|---|---|---|---|
| 1,775,082 | 9/30 | Beardsley | 248—429 |
| 2,066,557 | 1/37 | Cox | 248—429 |
| 2,286,946 | 6/42 | Ball | 248—424 |
| 2,827,947 | 3/58 | Wilkinson | 248—429 |

FOREIGN PATENTS

| | | |
|---|---|---|
| 643,418 | 6/62 | Canada. |
| 405,954 | 2/34 | Great Britain. |
| 413,397 | 7/34 | Great Britian. |
| 434,983 | 9/35 | Great Britain. |
| 508,017 | 6/39 | Great Britain. |

CLAUDE A. LE ROY, *Primary Examiner.*
FRANK L. ABBOTT, *Examiner.*